(12) United States Patent
Langlotz et al.

(10) Patent No.: US 11,649,396 B2
(45) Date of Patent: May 16, 2023

(54) ASSOCIATIVE COPOLYMERS WITH HYDROPHOBIC QUATERNIZED (METH)ACRYLAMIDE AND (METH)ACRYLIC ACID DERIVATIVES

(71) Applicant: BASF SE, Ludwigshafen am Rhein (DE)

(72) Inventors: Bjoern Langlotz, Ludwigshafen am Rhein (DE); Christian Bittner, Ludwigshafen am Rhein (DE); Stefan Stein, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 220 days.

(21) Appl. No.: 16/972,823

(22) PCT Filed: Jun. 3, 2019

(86) PCT No.: PCT/EP2019/064346
§ 371 (c)(1),
(2) Date: Dec. 7, 2020

(87) PCT Pub. No.: WO2019/233947
PCT Pub. Date: Dec. 12, 2019

(65) Prior Publication Data
US 2021/0246362 A1 Aug. 12, 2021

(30) Foreign Application Priority Data

Jun. 6, 2018 (EP) ..................................... 18176284

(51) Int. Cl.
*C09K 8/588* (2006.01)
*C08F 220/56* (2006.01)
(Continued)

(52) U.S. Cl.
CPC ............ *C09K 8/588* (2013.01); *C08F 220/56* (2013.01); *C08K 5/42* (2013.01); *C09K 8/035* (2013.01)

(58) Field of Classification Search
None
See application file for complete search history.

(56) References Cited

U.S. PATENT DOCUMENTS

| | | | |
|---|---|---|---|
| 4,814,096 A | 3/1989 | Evani | |
| 5,633,329 A | 5/1997 | Haehnle et al. | |

(Continued)

FOREIGN PATENT DOCUMENTS

| | | |
|---|---|---|
| GB | 1054028 A | 1/1967 |
| WO | 03/66190 A1 | 8/2003 |

(Continued)

OTHER PUBLICATIONS

International Preliminary Report on Patentability received for PCT Patent Application No. PCT/EP2019/064346, dated Aug. 26, 2020, 15 pages.

(Continued)

*Primary Examiner* — Charles R Nold
(74) *Attorney, Agent, or Firm* — Faegre Drinker Biddle & Reath LLP

(57) ABSTRACT

The present invention relates to a process for the preparation of a water-soluble copolymer comprising the step of reacting a monomer (a) of formula (I), wherein $Q^1$, $Q^2$, $R^1$ to $R^7$ and X have the meaning as indicated in the description and claims with at least one monoethylenically unsaturated, anionic monomer (b), preferably representing a monoethylenically unsaturated monomer comprising at least one carboxy, phosphonate or sulfonate group and salts thereof, preferably their ammonium salts or alkaline-earth metal salts or alkali metal salts; and at least one monoethylenically (Continued)

unsaturated, non-ionic monomer (c). The present invention further relates to a copolymer obtainable by said process and its use in enhanced oil recovery (EOR), a formulation comprising said copolymer and a method of oil production uses said formulation.

19 Claims, 1 Drawing Sheet

(51) Int. Cl.
*C08K 5/42* (2006.01)
*E21B 43/16* (2006.01)
*C09K 8/035* (2006.01)

(56) References Cited

U.S. PATENT DOCUMENTS

| | | |
|---|---|---|
| 6,417,268 B1 | 7/2002 | Zhang et al. |
| 7,619,046 B2 | 11/2009 | Broughton et al. |
| 2007/0287815 A1 | 12/2007 | Gaillard et al. |
| 2010/0197529 A1* | 8/2010 | Favero .................. C09K 8/588 507/224 |
| 2013/0005616 A1 | 1/2013 | Gaillard et al. |
| 2013/0255954 A1 | 10/2013 | Favero et al. |

FOREIGN PATENT DOCUMENTS

| | | |
|---|---|---|
| WO | 2008/071808 A1 | 6/2008 |
| WO | 2008/081048 A2 | 7/2008 |
| WO | 2012/069438 A1 | 5/2012 |
| WO | 2012/140092 A1 | 10/2012 |
| WO | 2015/086468 A1 | 6/2015 |

OTHER PUBLICATIONS

International Search Report and Written Opinion received for PCT Patent Application No. PCT/EP2019/064346, dated Jul. 5, 2019, 11 pages.
Kessel, "Chemical flooding—status report," Journal of Petroleum Science and Engineering, 2 (1989) 81-101.
Taylor et al., "Water-soluble hydrophobically associating polymers for improved oil recovery: A literature review", J. Petr. Sci. Eng., vol. 19, 1998, pp. 265-280.

* cited by examiner

ASSOCIATIVE COPOLYMERS WITH HYDROPHOBIC QUATERNIZED (METH)ACRYLAMIDE AND (METH)ACRYLIC ACID DERIVATIVES

CROSS-REFERENCE TO RELATED APPLICATIONS

This application is a national stage application (under 35 U.S.C. § 371) of PCT/EP2019/064346, filed Jun. 3, 2019, which claims benefit of European Application No. 18176284.0, filed Jun. 6, 2018, both of which are incorporated herein by reference in their entirety.

The present invention relates to a process for the preparation of a water-soluble copolymer comprising the step of reacting a monomer (a) of formula (I)

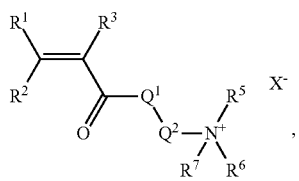

wherein $Q^1$, $Q^2$, $R^1$ to $R^7$ and X have the meaning as indicated in the description and claims with at least one monoethylenically unsaturated anionic monomer (b), preferably representing a monoethylenically unsaturated monomer comprising at least one carboxy, phosphonate or sulfonate group and salts thereof, preferably their ammonium salts or alkaline-earth metal salts or alkali metal salts; and at least one monoethylenically unsaturated non-ionic monomer (c). The present invention further relates to a copolymer obtainable by said process and its use in enhanced oil recovery (EOR), a formulation comprising said copolymer and a method of oil production uses said formulation.

In natural mineral oil deposits, mineral oil is present in the cavities of porous reservoir rocks sealed toward the surface of the earth by impervious overlying strata. The cavities may be very fine cavities, capillaries, pores or the like. Fine pore necks may have, for example, a diameter of only about 1 µm. As well as mineral oil, including fractions of natural gas, a deposit generally also comprises water of greater or lesser salt content.

If a mineral oil deposit has a sufficient autogenous pressure, after drilling of the deposit has commenced, mineral oil flows through the well to the surface of its own accord because of the autogenous pressure (primary mineral oil production). Even if a sufficient autogenous pressure is present at first, however, the autogenous pressure of the deposit generally declines relatively rapidly in the course of withdrawal of mineral oil, and so usually only small amounts of the amount of mineral oil present in deposit can be produced in this manner, according to the deposit type.

Therefore, when primary production declines, a known method is to drill further wells into the mineral oil-bearing formation in addition to the wells which serve for production of the mineral oil, called the production wells. Through these so-called injection wells, water is injected into the deposit in order to maintain the pressure or increase it again. The injection of the water forces the mineral oil through the cavities in the formation, proceeding gradually from the injection well in the direction of the production well. This technique is known as water flooding and is one of the techniques of what is called secondary oil production. In water flooding, however, there is always the risk that the mobile water will not flow homogeneously through the formation and in doing so mobilize oil, but will flow from the injection well to the production well, particularly along paths with a low flow resistance, without mobilizing oil, while there is only little flow, if any, through regions in the formation with high flow resistance. This is discerned from the fact that the proportion of the water which is produced via the production well increases ever further. By means of primary and secondary production, generally not more than about 30 to 35% of the amount of mineral oil present in the deposit can be produced.

A known method is to use techniques for tertiary mineral oil production (also known as "Enhanced Oil Recovery (EOR)") to enhance the oil yield, if economically viable production is impossible or no longer possible by means of primary or secondary mineral oil production. Tertiary mineral oil production includes processes in which suitable chemicals, such as surfactants and/or polymers, are used as auxiliaries for oil production. A review of tertiary oil production using chemicals can be found, for example, in the article by D. G. Kessel, Journal of Petroleum Science and Engineering, 2 (1989) 81-101.

The techniques of tertiary mineral oil production include what is called "polymer flooding". Polymer flooding involves injecting an aqueous solution of a thickening polymer into the mineral oil deposit through the injection wells, the viscosity of the aqueous polymer solution being matched to the viscosity of the mineral oil. Through the injection of the polymer solution, the mineral oil, as in the case of water flooding, is forced through said cavities in the formation from the injection well proceeding in the direction of the production well, and the mineral oil is produced through the production well. By virtue of the polymer formulation having about the same viscosity as the mineral oil, the risk that the polymer formation will break through to the production well with no effect is reduced. Thus, the mineral oil is mobilized much more homogeneously than when water, which is mobile, is used, and additional mineral oil can be mobilized in the formation.

A known method is to use hydrophobically associating copolymers for polymer flooding. "Hydrophobically associating copolymers" are understood by the person skilled in the art to mean water-soluble polymers having lateral or terminal hydrophobic groups, for example, relatively long alkyl chains. In aqueous solution, hydrophobic groups of this kind can associate with one another or with other substances having hydrophobic groups. This forms an associative network which causes an (additional) thickening effect. Details of the use of hydrophobically associating copolymers for tertiary mineral oil production are described, for example, in the review article by Taylor, K. C. and Nasr-El-Din, H. A. in J. Petr. Sci. Eng. 1998, 19, 265-280.

A possible way to improve the efficiency of such EOR polymers is the use of associative side-chains on the backbone of a high molecular weight polyacrylamide (PAM). Such side-chains can be introduced by vinyl ethers as monomers, which may be alkoxylated with ethylene oxide and butylene oxide. Essentially such monomer can be seen as surfactants with a double bond. Another approach is the use of (meth)acrylamide or (meth)acrylic acid derivatives, which bear a hydrophobically quaternized amine function. Although these monomers bear a cationic charge, which can be problematic for EOR applications due to the cationic moieties adsorbed onto the negatively charged reservoir rock, the overall negative charge of such a polymer overcompensates this effect. Such polymers are described in US 2007/0287815 A1.

A drawback of such quaternized amine-functional monomers is their low or lacking solubility in water.

Thus, there is a need for methods in order to prepare such EOR polymers overcoming the solubility problems on the monomer level to obtain EOR polymers with good properties for EOR, like viscosity, gel formation, and filtration properties.

It was therefore an object of the present invention to provide such methods and EOR polymers.

This object is achieved by a process for the preparation of a water-soluble copolymer comprising the step of
reacting a monomer (a) of formula (I)

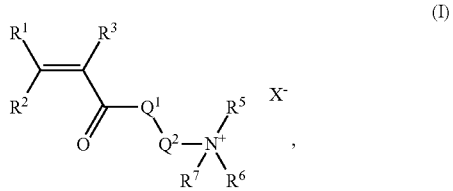

wherein
$Q^1$ is O or $N(R^4)$, preferably O;
$R^1$, $R^2$, $R^3$, $R^4$, $R^5$, $R^6$ are independently selected from the group consisting of H and $C_{1-4}$ alkyl;
$Q^2$ is an alkylene chain having 2 to 8 carbon atoms;
$R^7$ is a hydrocarbon radical having 6 to 32 carbon atoms;
X is a counter ion having a negative charge;
with at least one monoethylenically unsaturated anionic monomer (b), preferably representing a monoethylenically unsaturated monomer comprising at least one carboxy, phosphonate or sulfonate group and salts thereof, preferably their ammonium salts or alkaline-earth metal salts or alkali metal salts; and
at least one monoethylenically unsaturated non-ionic monomer (c);
wherein the reaction is carried out in the presence of at least a first additive, wherein the first additive has the formula $R^{10}$—$(OQ_3)_n$-OH, wherein $R^{10}$ is a hydrocarbon radical having 8 to 30 carbon atoms, each $Q_3$ is independently an alkylene group having 2 to 6 carbon atoms, preferably ethylene, and n is a number from 5 to 50.

Another aspect of the present invention is a water-soluble copolymer obtainable by the process for the preparation of the present invention.

Yet another aspect of the present invention is the use of the copolymer of the present invention in applications for enhanced oil recovery (EOR).

Surprisingly it was found that the addition of the at least first additive of formula (II) results in sufficient solubility of monomers of formula (I) resulting in copolymers with good EOR properties.

With regard to the invention, the following should be stated specifically:

Copolymer

The copolymer of the present invention is formed by at least three monomers, namely one or more (like one, two, three, or more, preferably one) monomers (a) of formula (I), one or more (like one, two, three, or more, preferably one) monoethylenically unsaturated anionic monomers (b) and one or more (like one, two, three, or more, preferably one) monoethylenically unsaturated non-ionic monomers (c).

However, also further ethylenically unsaturated monomers, preferably monoethylenically unsaturated monomers, can be part of the polymer of the present invention. Thus, there can be one, two, three or more monomers, which are different from monomers (a) to (c), and react in the polymer formation process.

Preferably, the copolymer of the present invention comprises monomers (a), (b) and (c) in an amount of at least 90 mol-% (90% to 100%), more preferably from 95 mol-% to 100 mol-%, even more preferably from 99 mol-% to 100 mol-%, based on the total amount of all monomers of the copolymer. In an even more preferred embodiment the copolymer is free from monomers other than monomers (a), (b), and (c).

Preferably, the weight-average molecular weight Mw of the copolymer of the present invention is greater than 500,000, advantageously greater than 1,000,000 and preferably greater than 2,000,000 g/mol. It may for instance be from 2,000,000 g/mol to 20,000,000 g/mol.

The copolymer of the present invention has typically thickening properties and is water-soluble. For the process according to the invention for mineral oil production, an aqueous formulation of at least one thickening, water-soluble copolymer of the present invention is used, injected into a mineral oil deposit through an injection well and crude oil withdrawn from the deposit through at least one production well. A process of this kind is also referred to as "polymer flooding" as described above.

Thus, an aspect of the present invention is an aqueous formulation comprising water and at least one copolymer of the present invention. Due to the preparation method of the present invention the aqueous formulation can also comprise the additives described herein, namely the at least first additive, optionally the at least second additive and optionally further additives.

Yet another aspect of the present invention is a process for mineral oil production from a deposit, comprising the steps of injecting an aqueous formulation comprising water and at least one copolymer of the present invention into a mineral oil deposit through an injection well and withdrawing crude oil from the deposit through at least one production well.

The copolymer of the present invention, or that used in accordance with the invention, is typically a hydrophobically associating copolymer. The term "hydrophobically associating copolymer" is known in principle to those skilled in the art. This comprises water-soluble copolymers which have hydrophobic groups as well as hydrophilic molecular moieties. In aqueous solution, the hydrophobic groups can associate with one another or with other substances having hydrophobic groups on the basis of intermolecular forces. This gives rise to a polymeric network linked by intermolecular forces, which enhances the viscosity-increasing action of the copolymers. The hydrophobic properties of the copolymer of the present invention are at least partly caused by monomer (a).

Ideally, the copolymers used in accordance with the invention should be miscible with water in any ratio. However, it is sufficient for the invention when the copolymers are water-soluble at least at the desired use concentration and at the desired pH. In general, the solubility in water at room temperature, preferably under the use conditions, should be at least 25 g/l. The water-solubility of the copolymer of the present invention is at least partly caused by monomer (b).

According to the invention, the copolymer of the present invention comprises preferably 0.01 mol-% to 1 mol-%, more preferably 0.05% to 0.5%, monomer (a), 9 mol-% to 70 mol-%, preferably 15% to 40%, monomer (b), 29 mol-% to 90.99 mol-%, preferably 59.5% to 84.5%, monomer (c), each based on the total amount of all monomers of the copolymer. In addition, it is of course also possible for further ethylenically unsaturated monomers, especially monoethylenically unsaturated monomers, to be present.

By means of further monomers, it is possible to modify the properties of the copolymer of the present invention and match them to the desired end use. The person skilled in the art will make a suitable selection regarding further ethylenically unsaturated monomers according to the desired properties of the polymer.

Monomers (a)

Monomer (a) is represented by formula (I)

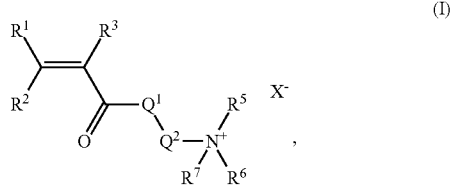

wherein
$Q^1$ is O or N($R^4$), preferably O;
$R^1$, $R^2$, $R^3$, $R^4$, $R^5$, $R^6$ are independently selected from the group consisting of H and $C_{1-4}$ alkyl;
$Q^2$ is an alkylene chain having 2 to 8 carbon atoms;
$R^7$ is a hydrocarbon radical having 6 to 32 carbon atoms;
X is a counter ion having a negative charge.

The copolymer of the present invention comprises at least one monomer unit resulting from monomer (a). Accordingly, the copolymer can comprise one, two, three, or more different monomer units, all of which resulting from monomer (a).

Preferably, $Q^1$ is O or NH. Thus, in one preferred embodiment $Q^1$ is O. in another preferred embodiment $Q^1$ is NH. In an even more preferred embodiment $Q^1$ is O.

Preferably, $R^1$ is H. Preferably, $R^2$ is H. Preferably $R^1$ and $R^2$ are H.

Preferably, $R^3$ is H or $CH_3$. Thus, in one preferred embodiment $R^3$ is H. in another preferred embodiment $R^3$ is $CH_3$.

Preferably, $R^5$, $R^6$ are independently selected from the group consisting of $C_{1-4}$ alkyl, preferably $CH_3$ or $C_2H_5$. Accordingly, $R^5$, $R^6$ are selected from $C_{1-4}$ alkyl and can be the same or different, preferably the same. The term "$C_{1-4}$ alkyl" refers to an alkyl group having 1 to 4 carbon atoms, which can be branched or straight-chained. Examples are methyl, ethyl, n-propyl, iso-propyl, n-butyl, sec-butyl tert.-butyl.

Preferably, $Q^2$ is an alkylene chain having 2 to 6, preferably 3, carbon atoms. The term "alkylene" refers to a bivalent alkylene group, which can be branched or straight-chained, preferably straight-chained.

Preferably, $R^7$ is a hydrocarbon radical having 8 to 24, preferably 8 to 20, more preferably 8 to 18, more preferably 8 to 16, more preferably 10 to 14, carbon atoms. The hydrocarbon radical can be cyclic (aromatic or aliphatic) or acyclic, preferably acyclic, saturated or unsaturated, preferably saturated, branched or straight-chained, preferably straight-chained, or the hydrocarbon radical can represent a hydrocarbon, which is cyclic and acyclic. Most preferably, the hydrocarbon radical is an unbranched alkyl group.

The counter ion X has a negative charge. However, the counter ion can have more than one negative charge resulting in more than one ammonium ions per monomer (a), as long as the monomer is uncharged and the formal charge of X is 1. However, it is preferred that X is a mono-charged anion, like a halide, preferably F, Cl, Br, I, a pseudohalide, like CN, SCN, OCN, ½ $CO_3$, ½ $SO_4$ and the like, preferably a halide, more preferably Br.

Examples of monomer (a) are described in US 2007/0287815 A1. Accordingly examples are N-acrylamidopropyl-N,N-dimethyl-N-dodecyl ammonium chloride (DMAPA Cl(C12)), Nmethacrylamidopropyl-N,N-dimethyl-N-dodecyl ammonium chloride (DMAPMA Cl(C12)), Nacrylamidopropyl-N,N-dimethyl-N-dodecyl ammonium bromide (DMAPA Br(C12)), Nmethacrylamidopropyl-N,N-dimethyl-N-dodecyl ammonium bromide (DMAPMA Br(C12)), Nacrylamidopropyl-N,N-dimethyl-N-octadecyl ammonium chloride (DMAPA Cl(C18)), Nmethacrylamidopropyl-N,N-dimethyl-N-octadecyl ammonium chloride (DMAPMA Cl(C18)), Nacrylamidopropyl-N,N-dimethyl-N-octadecyl ammonium bromide (DMAPA Br(C18)), Nmethacrylamidopropyl-N,N-dimethyl-N-octadecyl ammonium bromide (DMAPMA Br(C18)).

Preferably, the monomer (a) is a monomer of formula (I) wherein
$Q^1$ is NH, $R^1$ and $R^2$ are H, $R^3$ is $CH_3$, $R^5$ and $R^6$ are $CH_3$ $R^7$ is an unbranched alkyl chain having 12 carbon atoms;
$Q^1$ is NH, $R^1$ and $R^2$ are H, $R^3$ is H, $R^5$ and $R^6$ are $CH_3$ $R^7$ is an unbranched alkyl chain having 12 carbon atoms;
$Q^1$ is O, $R^1$ and $R^2$ are H, $R^3$ is $CH_3$, $R^5$ and $R^6$ are $CH_3$ $R^7$ is an unbranched alkyl chain having 12 carbon atoms; or
$Q^1$ is O, $R^1$ and $R^2$ are H, $R^3$ is H, $R^5$ and $R^6$ are $CH_3$ $R^7$ is an unbranched alkyl chain having 12 carbon atoms.

Monomer (b)

The copolymer of the present invention comprises monomer units resulting from at least one monoethylenically unsaturated, anionic monomer (b).

Preferably, the least one monoethylenically unsaturated, anionic monomer (b) represents a monoethylenically unsaturated monomer comprising at least one carboxy (—C(=O)OH), phosphonate (—P(=O)(OH)$_2$) or sulfonate (—S(=O)$_2$OH) group and salts thereof, preferably their ammonium salts or alkaline-earth metal salts or alkali metal salts.

Monomer (b) and the respective monomer unit can be partly or fully deprotonated, and in case of a charge value of more than one can have the same or mixed cations. The monomer (b) can comprise only one of the functional groups carboxy (—C(=O)OH), phosphonate (—P(=O)(OH)$_2$) or sulfonate (—S(=O)$_2$OH) group and salts or more than one, like two, three or more, preferably one or two, more preferably one. In case of more than one of such groups these can be the same or different.

More preferably, the at least one monoethylenically unsaturated, anionic monomer (b) is miscible with water in any ratio. In general, the solubility of the monomers (b) in water at room temperature should be at least 50 g/l, preferably at least 150 g/l and more preferably at least 250 g/l.

The acidic group is at least one acidic group selected from the group of —COOH, —SO$_3$H or —PO$_3$H$_2$ or salts thereof. Preference is given to monomers comprising —COOH groups and/or —SO$_3$H groups, especially —COOH.

Examples of monomers comprising —COOH groups include acrylic acid, methacrylic acid, crotonic acid, itaconic acid, maleic acid and fumaric acid. Preference is given to acrylic acid.

Examples of monomers comprising sulfonic acid groups include vinylsulfonic acid, allylsulfonic acid, 2-acrylamido-2-methylpropanesulfonic acid, 2-methacrylamido-2-methyl-propanesulfonic acid, 2-acrylamidobutanesulfonic acid, 3-acrylamido-3-methylbutanesulfonic acid and 2-acrylamido-2,4,4-trimethylpentanesulfonic acid. Preference is given to vinylsulfonic acid, allylsulfonic acid or 2-acrylamido-2-methylpropanesulfonic acid, and particular preference to or 2-acrylamido-2-methylpropanesulfonic acid.

Examples of monomers comprising phosphonic acid groups include vinylphosphonic acid, allylphosphonic acid, N-(meth)acrylamidoalkylphosphonic acids and (meth)acryloyloxyalkylphosphonic acids, preference being given to vinylphosphonic acid.

The monomer (b) preferably presents a moiety comprising the partial structure —C(—)=C(—)—, preferably —CH=CH—, like $CH_2$=CH— or HO(O)C—CH=CH— or more specifically $CH_2$=CH—$CH_2$— or cis or trans HO(O)C—CH=CH—C(O)OH.

More preferably, the at least one monoethylenically unsaturated, anionic monomer (b) is selected from the group consisting of acrylic acid, methacrylic acid, itaconic acid, crotonic acid, maleic acid, fumaric acid, 2-acrylamido-2-methylpropane sulfonic acid (ATBS), vinylsulfonic acid, vinylphosphonic acid, allylsulfonic acid, allylphosphonic acid and their salts thereof, preferably water-soluble salts of an alkali metal, alkaline-earth metal and ammonium. More preferably, the at least one monoethylenically unsaturated, anionic monomer (b) is acrylic acid, methacrylic acid, 2-acrylamide-2-methylpropane sulfonic acid, or a salt thereof, even more preferably, the at least one anionic monomer (b) is acrylic acid or a salt thereof, especially sodium acrylate.

Also, further functionalized monomers (b) are possible, like hydroxyethyl (meth)acrylate or hydroxypropyl (meth)acrylate, provided that monomer (b) is different from monomer (a) and (c). The acidic groups may of course be fully or partly neutralized, meaning that they may be present as salts. Suitable counterions for the acidic group include especially alkali metal ions such as $Li^+$, $Na^+$ or $K^+$ and ammonium ions $NH_4^+$ and ammonium ions having organic radicals.

Examples of ammonium ions having organic radicals include ammonium ions of the general formula $[NHR^{20}R^{21}R^{22}]+$ (VI) where the $R^{20}$, $R^{21}$ and $R^{22}$ radicals are each independently H or aliphatic and/or aromatic hydrocarbyl radicals having 1 to 12, preferably 1 to 6 carbon atoms, where the hydrocarbyl radicals may be substituted by OH groups and/or nonadjacent carbon atoms may be replaced by O or N, with the proviso that at least one of the $R^{20}$, $R^{21}$ and $R^{22}$ radicals is not H. In addition, the ammonium ions may also be of the general formula $[R^{20}R^{21}HN-R^{23}-NHR^{20}R^{21}]^{2+}$ (VII) where $R^{20}$ and $R^{21}$ are each as defined above and $R^{23}$ is an alkylene radical having 1 to 6 carbon atoms, preferably a 1,ω-alkylene radical having 2 to 6 carbon atoms. Examples of ammonium ions having organic radicals include $[NH(CH_3)_3]^+$, $[NH_2(CH_3)_2]^+$, $[NH_3(CH_3)]^+$, $[NH(C_2H_5)_3]^+$, $[NH_2(C_2H_5)_2]^+$, $[NH_3(C_2H_5)]^+$, $[NH_3(CH_2CH_2OH)]^+$, $[H_3N-CH_2CH_2-NH_3]^{2+}$ and $[H(H_3C)_2N-CH_2CH_2CH_2NH_3]^{2+}$.

Salts can be obtained by fully or partly neutralizing monomers (b) in the acid form with the appropriate bases prior to the polymerization. It is of course also possible to use monomers (b) in the acid form for polymerization and to fully or partly neutralize acid groups in the copolymer obtained after the polymerization.

Monomer (c)

The copolymer of the present invention comprises monomer units (c) resulting from at least one monoethylenically unsaturated, non-ionic monomer (c), preferably non-ionic water-soluble monomer (c).

More preferably, the at least one monoethylenically unsaturated, non-ionic monomer (c) is miscible with water in any ratio. In general, the solubility of the monomers (c) in water at room temperature should be at least 50 g/l, preferably at least 150 g/l and more preferably at least 250 g/l.

Examples of such monomers (c) are (meth)acrylamide, N-methyl(meth)acrylamide, N-isopropyl(meth)acrylamide, N,N'-dimethyl(meth)acrylamide, N-methylol(meth)acrylamide, N-vinylformamide, N-vinyl acetamide, N-vinylpyridine and N-vinylpyrrolidone. Preference is given to (meth)acrylamide, especially to acrylamide. If mixtures of the various monomers (c) are used, at least 50 mol % (50-100%) of the monomers (c) should be (meth)acrylamide, preferably acrylamide.

The at least one monomer (c) is preferably acrylamide or methacrylamide, N-isopropylacrylamide, N,N-dimethylacrylamide, N-methylolacrylamide, N-vinylformamide, N-vinyl acetamide, N-vinylpyridine or N-vinylpyrrolidone. Even more preferred is acrylamide or methacrylamide, even more preferably, acrylamide.

Preparation of the Copolymers

The preparation of the copolymer of the present invention is carried out in the presence of a first additive. Thus, the method according to the present invention requires at least one additive but more than one, like two, three or four additives may be present. Preferably one or two additives are present.

The at least first additive is an additive having the formula $R^{10}$—$(OQ_3)_n$-OH, wherein $R^{10}$ is a hydrocarbon radical having 8 to 30 carbon atoms, each $Q_3$ is independently an alkylene group having 2 to 6 carbon atoms, preferably ethylene, and n is a number from 5 to 50. Preferably, $R^{10}$ is a saturated aliphatic hydrocarbon radical, which can be branched or unbranched. Preferably, $R^{10}$ is unbranched (straight). Accordingly, $R^{10}$ is preferably an unbranched alkyl radical. $R^1$ has 8 to 30 carbon atoms, preferably 8 to 28, more preferably 8 to 26, even more preferably 8 to 24, even more preferably 8 to 22, even more preferably 10 to 20, even more preferably 12 to 18 carbon atoms. In one preferred embodiment $R^1$ has 10 to 14 or 16 to 20, more preferably 8 to 12 or 16 to 18 carbon atoms. In one preferred embodiment $R^{10}$ has 12 or 14 carbon atoms. In another preferred embodiment $R^{10}$ has 16 or 18 carbon atoms. Most preferred is a carbon atom number of 12 or 14.

The variable n is a number from 5 to 50, preferably from 5 to 40, more preferably from 5 to 30, even more preferably from 5 to 20, even more preferably from 5 to 15, even more from 8 to 12, even more preferably 10.

The reaction can be carried out in the presence of at least the first additive and a second additive, wherein the second additive is a sulfosuccinate of formula (II)

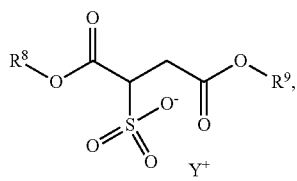

(II)

wherein $R^8$, $R^9$ are independently a hydrocarbon radical having 4 to 32 carbon atoms; and Y is a counter ion with a positive charge.

Preferably, $R^8$, $R^9$ are the same and preferably a hydrocarbon radical having 4 to 20 carbon atoms; and Y is preferably an alkali cation. More preferably, the first additive is sodium diisooctyl sulfosuccinate.

The molar amount of the at least first additives is preferably in the range from 0.0001 mol-% to 10 mol-%, more preferably from 0.001 mol-% to 1 mol-%, even more preferably from 0.005 mol % to 0.5 mol-%, based on the total amount of the copolymer. In the presence of a second additive, the same amounts are preferred.

Preferably, in case $R^1$ in formula (I) is $C_{1-4}$ alkyl the amount of the at least first additive is at least 0.15, preferably 0.2 mol-% based on the total amount of the copolymer.

Preferably, the molar ratio monomer (a) to at least first additive is 10:1 to 1:10, more preferably 8:1 to 1:8, even more preferably 5:1 to 1:5, even more preferably 3:1 to 1:3, even more preferably 2:1 to 1:2, even more preferably 1.5:1 to 1:1.5, even more preferably 1:1. Also preferred is 10:1 to 1:1, even more preferred 5:1 to 1:1, even more preferred 3:1 to 1:1, even more preferred 2:1 to 1:1. In the presence of a second additive, the same amounts are preferred.

Preferably, the molar ratio of first additive, the second additive or the first and the second additive to monomer (a) is 1:10 to 10:1, preferably 1:1 to 5:1.

In a preferred embodiment, the process of the present invention for the preparation of the water-soluble copolymer is a free-radical polymerization undertaken by means of gel polymerization, preferably by adiabatic gel polymerization in aqueous phase.

For gel polymerization, a solution comprising the monomers (a), (b), (c), further monomer(s) and additive(s), and also water or an aqueous solvent mixture, is provided first. Suitable aqueous solvent mixtures comprise water and water-miscible organic solvents, where the proportion of water is generally at least 60% by weight, preferably at least 85% by weight and more preferably at least 95% by weight. In one embodiment of the invention, exclusively water is used as the solvent. Water-miscible organic solvents which should be mentioned are especially alcohols such as methanol, ethanol or propanol. The concentration of all the monomers together is typically 10 to 60% by weight, preferably 20 to 50% by weight, for example, 25 to 45% by weight, based on the aqueous monomer solution.

Acidic monomers may be fully or partly neutralized prior to the polymerization. This can be effected, for example, with alkali metal hydroxides, or else with ammonia or amines. The polymerization should be performed especially at a pH in the range from 5 to 7.5, preferably 5 to 7 and, for example, at a pH of 6. The aqueous monomer solution may further comprise various additives, for example, defoamers or complexing agents.

To perform the gel polymerization, the aqueous monomer solution is cooled to a temperature of less than +10° C., preferably to −5° C. to +5° C. The mixture is inertized before, during or after the cooling. After the cooling, at least one initiator for the free-radical polymerization, which is soluble in the monomer solution, is added. The initiators may preferably be water-soluble, but even initiators which do not have good water solubility are soluble in the monomer solution. The initiators may be either thermal initiators or photoinitiators.

In one embodiment, the polymerization is initiated at temperatures of less than +10° C. using thermal polymerization initiators. For this purpose, thermal polymerization initiators, which can initiate the polymerization even at such low temperatures, are used. The person skilled in the art is aware of such polymerization initiators. Examples include redox initiators or azo initiators having an appropriately low temperature for a 10 h half-life. Because of the polymerization initiators added, the polymerization starts slowly at low temperatures. As a result of the heat of reaction released, the mixture heats up and the polymerization accelerates. The temperature of the mixture generally rises up to 80 to 90° C. The polymerization affords a generally solid polymer gel.

In a further embodiment of the gel polymerization, the reaction can be executed with a mixture of a redox initiator system and at least one thermal initiator which breaks down only at relatively high temperatures. This may, for example, be a water-soluble azo initiator which breaks down within the temperature range from 40° C. to 70° C. The polymerization here starts initially at the lower temperatures mentioned of less than +10° C., preferably −5° C. to +5° C., by virtue of the redox initiator system. As a result of the reaction heat released, the mixture heats up, as a result of which the initiator, which breaks down to free radicals only at relatively high temperatures starts to break down.

In a further embodiment, the polymerization can be performed using a combination of a photochemical initiator with a thermal initiator. In this case, the polymerization is initiated photochemically at low temperatures, and the heat of reaction released ultimately additionally triggers the thermal initiators.

The gel polymerization is generally effected without stirring. It can preferably be effected batch-wise, for example, in a raw reactor as described by GB 1,054,028. Particularly advantageously, it is possible to use conical reactors for this purpose, as described, for example, by U.S. Pat. No. 5,633,329 or 7,619,046 B2.

A suitable reactor for carrying out the gel polymerization is described in WO 2015/086468 A1.

DETAILED DESCRIPTION OF THE DRAWINGS

Figure 1:
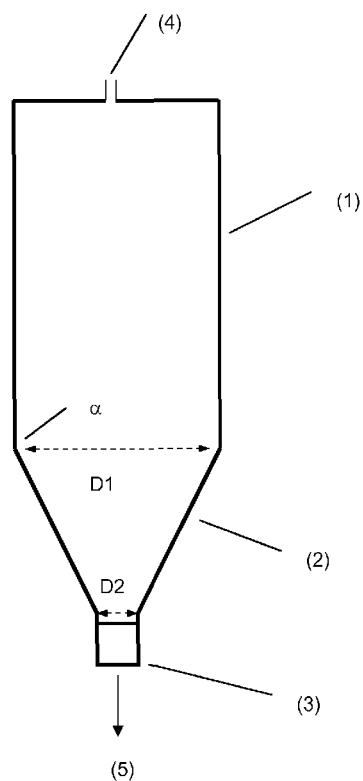
FIG. 1 shows a partly conical reactor suitable for gel polymerization.

FIG. 1 shows a conical reactor which can be used for performance of the gel polymerization. This is a vertical tubular reactor (1), which has a diameter D1 and narrows conically (2) at the lower end, where the diameter at the end of the conical narrowing is D2. The ratio D1/D2 is generally 2:1 to 25:1, preferably 2:1 to 20:1 and, for example, 3:1 to 10:1. The angle α between the wall in the cylindrical section (1) and the wall in the region of the conical narrowing (2) is more than 120° and less than 180, especially 135° to 175°, preferably 150° to 175° and, for example, 155° to 170°. The ratio of height to diameter D1 of the cylindrical section (1) of the reactor may be 4 to 40. The capacity of the reactors is chosen by the person skilled in the art according to the desired production capacity and may be 1 to 100 m$^3$, for example, 5 to 50 m$^3$, without any intention that the invention be restricted thereto.

The inner surface of the reactor has preferably been provided with a coating to reduce the adhesion of the reaction mixture to the reactor wall, for example, with a Teflon coating. The reactor may optionally be surrounded with a shell for cooling or heating of the reaction mixture.

At the lower end, the reactor has a shut-off device (3). The reactor further comprises at least one feed (4). Through this feed (4), the aqueous monomer solution and/or gases and/or further components can be passed into the reactor. Gases may especially be inert gases such as nitrogen, argon, or $CO_2$. Inert gases can be used to purge the reactor for inertization. Of course, it is also possible for different feeds to be present for different components, for example, separate feeds for the aqueous reaction solution and gases. The at least one feed (4) may preferably be mounted at the top of the reactor or at the side in the upper region of the reactor, but other arrangements are also possible, of course.

The reactor may of course comprise further components, for example, further feeds, for example, for compressed air or solvents, or discharge apparatuses for the gel, for example, movable rams arranged within the reactor, as described, for example, by GB 1,054,028.

Figure 2:
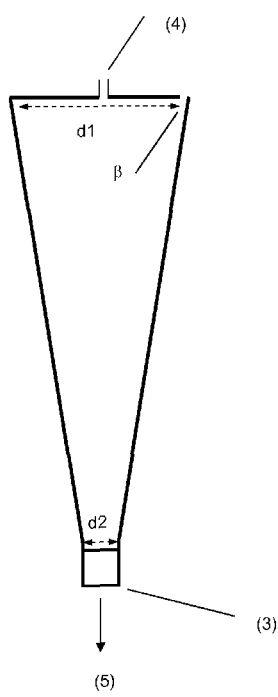
FIG. 2 shows a fully conical reactor suitable for gel polymerization.

FIG. 2 shows a fully conical reactor. It is of similar construction to the partly conical reactor shown in FIG. 1 just outlined, but does not have any cylindrical section. The diameter being d1 at the upper end of the conical reactor and d2 at the lower end. The ratio d1/d2 is generally 1.1:1 to 25:1, especially 2:1 to 25:1, preferably 2.1 to 10:1 and, for example, 3.1 to 10:1. The angle R between the upper diameter d1 and the reactor wall is more than 45 and less than 90°, preferably 60° to 89°, for example, 70° to 88°. For the rest, reference is made to the above description.

Of course, the reactor may comprise further components, for example, further feeds, for example, for compressed air or solvents, or discharge apparatuses for the gel, for example, movable rams arranged within the reactor, as described, for example, by GB 1,054,028.

The gel polymerization in the fully or partly conical reactors can preferably be performed under adiabatic conditions or at least essentially adiabatic conditions. In the case of this procedure, the reactor does not have any cooling or heating. It will be apparent to the person skilled in the art that—according to the internal temperature of the reactor and/or the ambient temperature—certain amounts of heat can be released or absorbed via the reactor wall, but this effect naturally plays an ever smaller role with increasing reactor size.

For polymerization, the above-described aqueous monomer mixture is mixed in a suitable mixing and cooling apparatus disposed outside the conical reactor, and is cooled to less than +10° C., preferably to −5° C. to +5° C. This can be effected, for example, in a mixing tank which is cooled in a suitable manner, for example, by means of circulation cooling. After the monomer mixture has been cooled, it is already possible to add initiators which do not yet form any free radicals at the low temperatures, for example, at least one of the above-written azo initiators which initiate the polymerization only at 40° C. to 70° C. However, such initiators can also be added only at a later juncture.

For polymerization, the monomer solution is generally inertized, i.e. free of any oxygen present. This can be effected, for example, by purging the monomer solution with an inert gas such as nitrogen, argon or carbon dioxide. This purging can already be effected during the mixing and cooling of the aqueous monomer solution, in a separate apparatus for inertization, for example, the apparatus described in WO 03/066190 A1, or else in the reactor itself. Preference is given to inertizing upstream of the reactor.

Polymerization initiators which can trigger the polymerization even at low temperatures are dissolved separately and added to the aqueous monomer solution only immediately before the polymerization. This can be effected, for example, by injecting a solution of the initiators into the reactor during the filling of the reactor with the aqueous monomer solution. For complete mixing of the initiator solution with the aqueous monomer solution, suitable mixing units, especially static mixers, may be integrated into the monomer feed. Of course, it is possible to add all initiators to the monomer solution in this way.

Because of the polymerization initiators added, the polymerization commences at temperatures of less than +10° C. The heat of reaction released heats up the mixture, and the polymerization accelerates. The temperature of the mixture generally rises to up to 80 to 90° C. The polymerization affords a generally solid polymer gel.

The polymer gel obtained is preferably comminuted and dried. The drying should preferably be effected at temperatures below 100° C. To avoid sticking, a suitable separating agent can be used for this step. The hydrophobically associating copolymer is obtained in the form of granules or powder.

Since the polymer powder or granules obtained is/are generally used in the form of an aqueous solution in the course of the employment at the site of use, the polymer has to be dissolved in water on site. This can cause unwanted formation of lumps with the high molecular weight polymers described. In order to avoid this, as early as in the course of synthesis, it is possible to add an auxiliary which accelerates or improves the dissolution of the dried polymer in water to the inventive polymers. This auxiliary may, for example, be urea.

The gel polymerization may also be continuous. For this purpose, for example, a polymerization apparatus having a conveyor belt to accommodate the mixture to be polymerized can be used. The conveyor belt may be equipped with devices for heating and/or for irradiation with UV radiation. In this method, the mixture is poured on by means of a suitable apparatus at one end of the belt, the mixture is polymerized in the course of transport in belt direction, and the solid gel can be removed at the other end of the belt.

Process for Mineral Oil Production

To execute the process according the invention, at least one production well and at least one injection well are sunk into the mineral oil deposit. In general, a deposit will be provided with a plurality of injection wells and with a plurality of production wells. An aqueous formulation of the copolymer described is injected into the mineral oil deposit through the at least one injection well, and mineral oil is withdrawn from the deposit through at least one production well. By virtue of the pressure generated by the aqueous formulation injected, called the "polymer flood", the mineral oil flows in the direction of the production well and is produced through the production well. In this context, the term "mineral oil" does not just mean a single-phase oil; instead, the term also encompasses the customary crude oil-water emulsions.

According to the invention, the deposit temperature of the mineral oil deposit, in which the process according the invention is employed, is 20 to 120° C., especially 35° C. to 120° C., preferably 40° C. to 100° C., more preferably 45° C. to 90° C. and, for example, 50° C. to 80° C.

It will be apparent to the person skilled in the art that a mineral oil deposit may also have a certain temperature distribution. Said deposit temperature is based on the region of the deposit between the injection and production wells, which is covered by the polymer flooding. Means of determining the temperature distribution of a mineral oil deposit are known in principle to those skilled in the art. The temperature distribution is generally determined from temperature measurements at particular points in the formation, in combination with simulation calculations, which also take account of the amounts of heat introduced into the formation and the amounts of heat removed from the formation.

The process according the invention can be employed especially in the case of mineral oil deposits having an average porosity of 10 mD ($9.87*10^{-15}$ $m^2$) to 4 D ($3.95*10^{-12}$ $m^2$), preferably 100 mD ($9.87*10^{-14}$ $m^2$) to 2 D ($1.97*10^{-12}$ $m^2$) and more preferably 200 mD ($1.97*10^{-13}$ $m^2$) to 1 D ($9.87*10^{-13}$ $m^2$). The permeability of a mineral oil formation is reported by the person skilled in the art in the unit "darcies" (abbreviated to "D" or "mD" for "millidarcies", 1 D=$9.86923*10^{-13}$ $m^2$) and can be determined from the flow rate of a liquid phase in the mineral oil formation as a function of the pressure differential applied. The flow rate can be determined in core flooding experiments with drill cores removed from the formation. Details of this can be found, for example, in K. Weggen, G. Pusch, H. Rischmuller in "*Oil and Gas*", pages 37 ff., *Ullmann's Encyclopedia of Industrial Chemistry, Online Edition*, Wiley-VCH, Weinheim 2010. It will be apparent to a person skilled in the art that the permeability in a mineral oil deposit need not be homogeneous; instead, it may generally have a certain distribution and the stated permeability of a mineral oil deposit is accordingly an average permeability.

The process is executed using an aqueous formulation comprising, as well as water, at least the copolymer of the present invention described. It is, of course, also possible to use mixtures of various copolymers.

The formulation can be made up in freshwater or else in water comprising salts. Of course, mixtures of various salts may be involved. For example, it is possible to use seawater to make up the aqueous formulation, or it is possible to use produced formation water, which is reused in this way. In the case of offshore production platforms, the formulation is generally made up in seawater. In onshore production installations, the polymer can advantageously first be dissolved in freshwater, and the solution obtained can be diluted to the desired use concentration with formation water.

The salts may especially be alkali metal salts and alkaline earth metal salts. Examples of typical cations include $Na^+$, $K^+$, $Mg^{2+}$ and $Ca^{2+}$, and examples of typical anions include chloride, bromide, hydrogencarbonate, sulfate and borate.

If the formulation comprises salts, generally at least one or more than one alkali metal ion is present, especially at least $Na^+$. In addition, it is also possible for alkaline earth metal ions to be present, in which case the weight ratio of alkali metal ions/alkaline earth metal ions is generally ≥2, preferably ≥3. The anions present are generally at least one or more than one halide ion, especially at least $Cl^-$. In general, the amount of $Cl^-$ is at least 50% by weight, preferably at least 80% by weight, based on the sum total of all the anions.

The total amount of all the salts in the aqueous formulation may be up to 350 000 ppm (parts by weight) based on the sum total of all the components in the formulation, for example, 2000 ppm to 350 000 ppm, especially 5000 ppm to 250 000 ppm. If seawater is used to make up the formulation, the salt content may be 2000 ppm to 40 000 ppm, and, if formation water is used, the salt content may be 100 000 ppm to 250 000 ppm, for example, 100 000 ppm to 200 000 ppm. The amount of alkaline earth metal ions may preferably be 1000 to 53 000 ppm.

The aqueous formulation may of course comprise further components. Examples of further components include biocides, stabilizers, free-radical scavengers, initiators, surfactants, cosolvents, bases and complexing agents. Also, the additives described in connection with the preparation of the copolymer of the present invention can be comprised, namely the at least first, optionally the second and optionally any further additive.

Surfactants and/or bases can be used, for example, to support the oil-removing effect of the copolymers. Examples of preferred surfactants are disclosed further down. Surfactants can also be used to increase the viscosity of the polymer used. For example, it is possible to use the surfactants disclosed by WO 2012/069438 A1.

Additives can be used, for example, to prevent unwanted side effects, for example, the unwanted precipitation of salts, or to stabilize the copolymer used. These additives can be the same or different compared to the additives for preparation. The polymer formulations injected into the formation in the course of polymer flooding flow only very gradually in the direction of the production well, meaning that they remain under formation conditions in the formation for a prolonged period. Degradation of the polymer results in a decrease in viscosity. This either has to be taken into account through the use of a higher amount of polymer, or else it has to be accepted that the efficiency of the process will worsen. In any case, the economic viability of the process worsens. A multitude of mechanisms may be responsible for the degradation of the polymer. By means of suitable additives, it is possible to prevent or at least delay the polymer degradation according to the conditions.

In one embodiment of the invention, the aqueous formulation used comprises at least one oxygen scavenger. Oxygen scavengers react with oxygen which may possibly be present in the aqueous formulation, and thus prevent the oxygen from attacking the polymer. Examples of oxygen scavengers include sulfites, for example, $Na_2SO_3$, bisulfites or dithionites.

In a further embodiment of the invention, the aqueous formulation used comprises at least one free-radical scavenger. Free-radical scavengers can be used to counteract the degradation of the polymer by free radicals. Compounds of this kind can form stable compounds with free radicals. Free-radical scavengers are known in principle to those skilled in the art. For example, they may be stabilizers selected from the group of sulfur compounds, sterically hindered amines, N-oxides, nitroso compounds, aromatic hydroxyl compounds or ketones. Examples of sulfur compounds include thiourea, substituted thioureas such as N,N'-dimethylthiourea, N,N'-diethylthiourea, N,N'-diphenylthiourea, thiocyanates, for example, ammonium thiocyanate or potassium thiocyanate, tetramethylthiuram disulfide, and mercaptans such as 2-mercaptobenzothiazole or 2-mercaptobenzimidazole or salts thereof, for example, the sodium salts, sodium dimethyldithiocarbamate, 2,2'-dithiobis(benzothiazole), 4,4'-thiobis(6-t-butyl-m-cresol). Further examples include dicyandiamide, guanidine, cyanamide, paramethoxyphenol, 2,6-di-t-butyl-4-methylphenol, butylhydroxyanisole, 8-hydroxyquinoline, 2,5-di(t-amyl)hydroquinone, 5-hydroxy-1,4-naphthoquinone, 2,5-di(t-amyl)hydroquinone, dimedone, propyl 3,4.5-trihydroxybenzoate, ammonium N-nitrosophenylhydroxylamine, 4-hydroxy-2,2,6,6-tetramethyoxylpiperidine, (N-(1,3-dimethylbutyl)-N'-phenyl-p-phenylenediamine and 1,2,2,6,6-pentamethyl-4-piperidinol. Preference is given to sterically hindered amines such as 1,2,2,6,6-pentamethyl-4-piperidinol and sulfur compounds, mercapto compounds, especially 2-mercaptobenzothiazole or 2-mercaptobenzimidazole or salts thereof, for example, the sodium salts, and particular preference is given to 2-mercaptobenzothiazole or salts thereof.

In a further embodiment of the invention, the aqueous formulation used comprises at least one sacrificial reagent. Sacrificial reagents can react with free radicals and thus render them harmless. Examples include especially alcohols. Alcohols can be oxidized by free radicals, for example, to ketones. Examples include monoalcohols and polyalcohols, for example, 1-propanol, 2-propanol, propylene glycol, glycerol, butanediol or pentaerythritol.

In a further embodiment of the invention, the aqueous formulation used comprises at least one complexing agent. It is of course possible to use mixtures of various complexing agents. Complexing agents are generally anionic compounds which can complex especially divalent and higher-valency metal ions, for example, $Mg^{2+}$ or $Ca^{2+}$. In this way, it is possible, for example, to prevent any unwanted precipitation. In addition, it is possible to prevent any polyvalent metal ions present from crosslinking the polymer by means of acidic groups present, especially COOH group. The complexing agents especially may be carboxylic acid or phosphonic acid derivatives. Examples of complexing agents include ethylenediaminetetraacetic acid (EDTA), ethylenediaminesuccinic acid (EDDS), diethylenetriaminepentamethylenephosphonic acid (DTPMP), methylglycinediacetic acid (MGDA) and nitriloacetic acid (NTA). Of course, the corresponding salts of each may also be involved, for example, the corresponding sodium salts. As an alternative to or in addition to the abovementioned chelating agents, it is also possible to use polyacrylates.

In a further embodiment of the invention, the formulation comprises at least one organic cosolvent. Preference is given to fully water-miscible solvents, but it is also possible to use only partly water-miscible solvents. In general, the solubility should be at least 50 g/l, preferably at least 100 g/l. Examples include aliphatic $C_4$ to $C_8$ alcohols, preferably $C_4$ to $C_6$ alcohols, which, to attain adequate water solubility, may be substituted by 1 to 5, preferably 1 to 3, ethyleneoxy units. Further examples include aliphatic diols having 2 to 8 carbon atoms, which may optionally also have further substitution. For example, the cosolvent may be at least one selected from the group of 2-butanol, 2 methyl-1-propanol, butylglycol, butyldiglycol and butyltriglycol.

The concentration of the copolymer in the aqueous formulation is fixed such that the aqueous formulation has the desired viscosity for the end use. The viscosity of the formulation should generally be at least 5 mPas (measured at 25° C. and a shear rate of 7 $s^{-1}$), preferably at least 10 mPas.

In general, the concentration of the copolymer in the formulation is 0.02 to 2% by weight based on the sum total of all the components in the aqueous formulation. The amount is preferably 0.05 to 0.5% by weight, more preferably 0.1 to 0.3% by weight and, for example, 0.1 to 0.2% by weight.

In a further embodiment, the concentration of the copolymer in the formulation is not more than 0.05% by weight used, especially 0.01% by weight to 0.05% by weight, preferably 0.02% by weight to 0.05% by weight.

If the copolymer is in the form of a powder or granules, the copolymers have to be dissolved in the aqueous medium for injection. Granules may have, for example, an average particle size of 0.1 mm to 3 mm. The person skilled in the art is aware that excessive shear stresses should be avoided in the dissolution of high molecular weight polymers, in order to avoid degradation of the polymers. Apparatus and processes for dissolving polymers and injecting the aqueous solutions into underground formations are known in principle to those skilled in the art.

The aqueous formulation can be produced by initially charging the water, scattering in the copolymer in the form of powder or granules and mixing it with the water.

In a further embodiment of the invention, the copolymer granules or powder can be dissolved by means of a two-stage process. This involves dissolving, in a first dissolution stage, polymer granules or powder in an aqueous medium to obtain a concentrate. Such a concentrate may have, for example, a concentration of 1% by weight to 3% by weight. This can be done, for example, in appropriate dissolution tanks. In a second stage, the concentrate is diluted to use concentration. This can be done by injecting the concentrate directly into the pipeline together with the injection fluid. For rapid mixing, a mixer, especially a static mixer, may be disposed beyond the injection point. Such a process is disclosed by WO 2012/140092 A1.

In a further embodiment of the invention, the dissolution can be effected by moistening the polymer granules with an aqueous phase in a first step. This causes the polymer to swell in the aqueous phase. The concentration of the polymer may, for example, be about 2 to 10% by weight, based on the total amount of aqueous phase and polymer. The swollen polymer is subsequently comminuted by means of a suitable comminuting apparatus, for example, to a size of 0.05 mm to 0.2 mm, and mixed with further water. This gives rise to a polymer dispersion which may have, for example, a concentration of 1 to 3% by weight of polymer. The polymer dispersion can be dissolved fully in further dissolution tanks. In one variant, dissolution tanks can be dispensed with and the polymer dispersion can be injected directly into the pipeline together with the injection fluid, where the polymer dissolves fully on the way to the injection site. The latter is advantageous especially when the injection fluid is transported over a certain distance in the pipeline, for example, from a central dissolution station on the oilfield to various injection wells. Suitable apparatuses for the process outlined are disclosed, for example, WO 2008/071808 A1 and WO 2008/081048 A1.

The injection of the aqueous formulation can be undertaken by means of customary apparatus. The formulation can be injected by means of customary pumps into one or more injection wells. The injection wells have typically been lined with cemented steel tubes, and the steel tubes have been perforated at the desired point. The formulation enters the mineral oil formation from the injection well through the perforation. The pressure applied by means of the pumps, in a manner known in principle, fixes the flow rate of the formulation and hence also the shear stress, with which the aqueous formulation enters the formation. The shear stress on entry into the formation can be determined by the person skilled in the art in a manner known in principle on the basis of the Hagen-Poiseuille law using the area, through which the flow passes on entry into the formation, the mean pore radius and the volume flow rate. The average permeability of the formation can be determined as described in a manner known in principle. Naturally, the greater the volume flow rate of aqueous copolymer formulation injected into the formation, the greater the shear stress.

The rate of injection can be fixed by the person skilled in the art according to the conditions in the formation. The shear rate on entry of the aqueous polymer formulation into the formation is preferably at least 30 000 s$^{-1}$, preferably at least 60 000 s$^{-1}$ and more preferably at least 90000 s$^{-1}$.

In the process according to the invention, what is withdrawn from the production well will generally not be single-phase oil but a crude oil/water emulsion. The term "crude oil/water emulsion" here shall include both water-in-oil and oil-in-water emulsions. The oil-water emulsions may comprise, for example, 0.1 to 99% by weight of water. The water may be saline deposit water. With increasing duration of polymer injection, the water produced may, however, also comprise the copolymers injected.

For further processing of the crude oil in the refinery, the crude oil/water emulsion produced has to be separated. For this purpose, it is possible to add demulsifiers in a manner known per se. Plants and processes for splitting crude oil emulsions are known to those skilled in the art. The emulsion is typically split on site, i.e. while still at the oilfield. This may be a plant installed at a production well or a central plant in which the splitting of the crude oil emulsions is undertaken for several production wells of an oilfield.

The splitting already proceeds at the temperature of the freshly produced crude oil emulsion at such a rate that the emulsion can already be split on the way to the treatment plant. This broken emulsion is then separated into pure oil and water, or salt water, in an optionally heated separator and possibly with the aid of an electrical field. The separator may comprise plants which separate only under the influence of gravity, i.e., for example, settling tanks, or else other separators, for example, hydrocyclones.

After the separation, the crude oil phase can be transported into the refinery for further processing. The aqueous phase removed can preferably be reused for injection.

If the aqueous phase of the oil-water emulsion produced comprises proportions of the copolymer injected, the phase separation can be delayed or in the extreme case even prevented. It is therefore regularly advisable to at least partly degrade the polymer. This can be done by the addition of oxidizing agents to the aqueous phase. Examples of suitable oxidizing agents comprise hydrogen peroxide, persulfates, hypochlorites or chlorites.

Alkali-Polymer Flooding

In one embodiment of the invention, the process according the invention is an alkali-polymer flooding operation.

For alkali-polymer flooding, an aqueous formulation comprising, as well as water, at least the copolymer described and at least one base is used. The pH of the aqueous formulation is generally at least 8, preferably at least 9, especially 9 to 13, preferably 10 to 12 and, for example, 10.5 to 11.

In principle, it is possible to use any kind of base with which the desired pH can be attained, and the person skilled in the art will make a suitable selection. Examples of suitable bases include alkali metal hydroxides, for example, NaOH or KOH, or alkali metal carbonates, for example, Na$_2$CO$_3$. In addition, the bases may be basic salts, for example, alkali metal salts of carboxylic acids, phosphoric acid, or especially complexing agents comprising acidic groups in the base form, such as EDTA-Na$_4$.

The addition of a base has the effect that additional mineral oil can be mobilized. Mineral oil typically also comprises various carboxylic acids, for example, naphthenic acids, which are converted to the corresponding salts by the basic formulation. The salts act as naturally occurring surfactants and thus support the process of oil removal.

With regards to further details of the process and of the aqueous formulations used, reference is made to the above description. The formulations used for alkali-polymer flooding may be the above-described formulations, including the preferred embodiments, with the proviso that the formulation additionally comprises at least one base and has the above-described pH.

In one embodiment of the invention, the formulation used for alkali-polymer flooding additionally comprises at least one complexing agent. In this way, it is advantageously possible to prevent unwanted precipitation of sparingly soluble salts, especially Ca and Mg salts, when the alkaline aqueous formulation comes into contact with the corresponding metal ions and/or aqueous formulations for the process comprising corresponding salts are used. The amount of complexing agents is selected by the person skilled in the art. It may, for example, be 0.1 to 4% by weight, based on the sum of all the components of the aqueous formulation.

Alkali-Surfactant-Polymer Flooding

In a further embodiment of the invention, the process according to the invention is an alkali-surfactant-polymer flooding operation.

For alkali-surfactant-polymer flooding, an aqueous formulation comprising, as well as water, at least the copolymer described, at least one base and at least one surfactant is used. The pH of the aqueous formulation is at least 8, preferably at least 9, especially 9 to 13, preferably 10 to 12 and, for example, 10.5 to 11. Suitable bases have already been mentioned above.

The surfactants used may in principle be any surfactants suitable for surfactant flooding. Surfactants of this kind are known in principle to those skilled in the art. Examples of suitable surfactants for surfactant flooding include surfactants comprising sulfate groups, sulfonate groups, polyoxyalkylene groups, anionically modified polyoxyalkylene groups, betaine groups, glucoside groups or amine oxide groups, for example, alkylbenzenesulfonates, olefinsulfonates, amidopropyl betaines, alkyl polyglucosides, alkyl polyalkoxylates or alkyl polyalkoxysulfates, -sulfonates or -carboxylates. It is possible with preference to use anionic surfactants, optionally in combination with nonionic surfactants.

The concentration of the surfactants is generally 0.01% by weight to 2% by weight, preferably 0.05 to 1% by weight and, for example, 0.1 to 0.8% by weight, based on the sum total of all the components of the aqueous formulation.

With regard to further details of the process and of the aqueous formulations used, reference is made to the above description. The formulations used for alkali-surfactant-polymer flooding may be the above-described formulations, including the preferred embodiments, with the proviso that the formulation additionally comprises at least one base and at least one surfactant, preferably the surfactants just outlined, and has the above-described pH.

In one embodiment of the invention, the formulation used for alkali-surfactant-polymer flooding additionally comprises at least one complexing agent. It is advantageously possible in this way to avoid unwanted precipitation of sparingly soluble salts, especially Ca and Mg salts, when the alkaline aqueous formulation comes into contact with the corresponding metal ions and/or aqueous formulations for the process comprising corresponding salts are used. The amount of complexing agents is selected by the person skilled in the art. It may, for example, be 0.1 to 4% by weight, based on the sum total of all the components of the aqueous formulation.

Combined Process

The process according to the invention can of course be combined with further process steps.

In one embodiment, the process can be combined with water flooding. In water flooding, water is injected into a mineral oil deposit through at least one injection well and crude oil is withdrawn from the deposit through at least one production well. The water may be freshwater or saline water, for example, seawater or deposit water. After the water flooding, the process according the invention for polymer flooding can be employed.

In a further embodiment, the process can also be combined with surfactant flooding. In surfactant flooding, an aqueous surfactant solution is injected into a mineral oil deposit through at least one injection well and crude oil is withdrawn from the deposit through at least one production well. The water may be freshwater or saline water, such as seawater or deposit water. The surfactants may be the abovementioned surfactants, including the preferred surfactants described. The aqueous surfactant solution may also additionally comprise a base. Such a technique is called alkali-surfactant flooding. Possible process sequences are water flooding→surfactant flooding→polymer flooding or water flooding→alkali-surfactant flooding→polymer flooding.

Of course, the process according the invention can also be employed several times in succession with varying aqueous formulations. For example, it is possible to increase the concentration of the polymer in the formulations stepwise. A further combination may comprise, as the first step, alkali-surfactant flooding, followed by polymer flooding without surfactant and alkali as the second step.

A further embodiment comprises alkali-surfactant-polymer flooding as the first step, followed by polymer flooding without surfactant and alkali as the second step.

A further embodiment comprises surfactant-polymer flooding as the first step, followed by polymer flooding without surfactant as the second step.

In each of the latter combinations, aqueous formulations having higher salinity can be used in the first step than in the second step. Alternatively, both steps can also be conducted with water of equal salinity.

A further embodiment comprises the pumping of the aqueous polymer solution in the presence of, or in alternation with, gases (e.g. nitrogen, methane, ethane, propane, butane or carbon dioxide). This process can optionally be conducted in the presence of surfactants.

EXAMPLES

List of Abbreviations

EOR Enhanced Oil Recovery
NaAA Sodium acrylate
AM Acrylamide
$C_{14}TAB$ Tetradecyltrimethylammonium bromide
SDS Sodium dodecylsulfate
Aromox C/12 Cocobis (2-hydroxyethyl) amine oxide
Aromox MCD Coconut dimethylaminoxide
Disponil A 1080 lin. fatty alcohol ethoxylate, $C_{12/14}(EO)_{10}H$
Glucopon 225 DK C8/C10 polyglucoside
Texapon NSO Sodium laureth sulfate
Deriphat 160C Sodium-N-lauryl-R-iminodipropionate Dehyquart E-CA (2-hydroxyethyl)(2-hydroxyhexadecyl)dimethylammonium chloride
Lutensit AB-O sodium di(2-ethyl-hexyl) sulfosuccinate
Lutensol TO 129 $iC_{13}(EO)_{12}H$, $iC_{13}$: alkyl moiety of $C_{13}$ oxo alcohol
Lutensol AT 18 C16C18-Fatty Alcohol+18 EO
Lutensol AO 11 C13C15-Alcohol+11 EO
Lutensol XP 100 C10-Guerbet alcohol+10 EO
AIBN Azoisobutyronitrile
ACVA 4,4'-Azobis(4-cyanovaleric acid)
tBHP tert-butylhydroperoxide Monomers Used

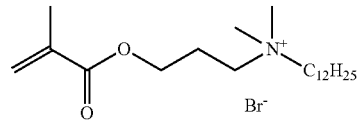

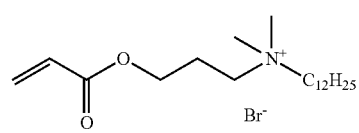

Solubility Tests with Monomer 1

In order to solubilize monomer 1 the monomer was first dissolved in ethanol and then added to the monomer solution. This approach is used for AIBN, which has a low solubility in the monomer solution, too. In this case this approach failed and a fine precipitate was formed. The same applied for the monomer 2. Therefore, the use of auxiliary surfactants (additives) was tested.

As can be seen from Table 1 a variety of primary and secondary auxiliary surfactants (additives) was used up to 20 equivalents, which is typical for a micellar polymerization.

Neither anionic surfactants such as SDS and Texapon NSO, nor cationic like $C_{14}TAB$, nor N-oxide such as Aromox C/12 or MCD, nor alky polyglucosides such as Glucopon 225DK, nor pendant +− charged surfactants such as Deriphat 160C, nor zwitterionic surfactants such as Deriphat E-CA were able to solubilize the monomer 1.

TABLE 1

Solubility tests of monomer 1 with the help of auxiliary surfactants (recipe: 27 mol % sodium acrylate, 72.9 mol % acrylamide, 0.1 mol % 1)

| Additive 1 | Amount* [eq] | Result |
|---|---|---|
| — | — | Not soluble** |
| SDS | 2-20 | Not soluble** |
| $C_{14}TAB$ | 2-20 | Not soluble** |
| Aromox C/12 | 2-20 | Not soluble** |
| Aromox MCD | 2-20 | Not soluble** |
| Glucopon 225DK | 2-20 | Not soluble** |
| Texapon NSO | 2-20 | Not soluble** |
| Deriphat 160 C | 2-20 | Not soluble** |
| Dehyquart E-CA | 2-20 | Not soluble** |

*active content of surfactant relative to the amount of 1
**not suitable for MPFR determination Surprisingly just one equivalent of non-ionic surfactant Disponil A 1080 was sufficient to solubilize the monomer 1 in the monomer mixture. These tests were done in first instance with 0.1 mol % of 1.

Preparation of copolymer with additive Disponil A 1080

Copolymers of acryl amide (c), sodium acrylate (b) and cationic monomer 1

75.00 g of dist. water was placed in a beaker and subsequently 126.67 g of sodium acrylate, 181.13 g of AM solution (50% in water) and 1.2 g of Trilon C solution (5% in water) were added. Subsequently 0.68 g of 4 and 1.1 g of Disponil A 1080 and 3.00 g of a 4% ACVA solution in 1N NaOH$_{(aq)}$ was add and the pH was adjusted with sulfuric acid to pH 6.0. Subsequently the residual water (without the water needed for the initiators) to obtain an active content of 34% was added and the solution was cooled down to −3° C. and 3 g of AIBN (4% solution in methanol) was added. After this the solution was transferred into a thermos flask and degassed by nitrogen purge for 30 min 0.12 g of tBHP (1% solution in water) was added and 1 min later 0.24 g of sodium sulfite (1% solution in water) was added in order to initiate the polymerization. After the temperature maximum is reached (approx. 94° C.) the thermos flask was placed in a heating cabinet at 80° C. for 2 h. Afterwards the gel was granulated and dried for 2 h at 55° C. in a fluid bed drier.

The copolymer of acryl amide (c), sodium acrylate (b) and cationic monomer 2 was prepared accordingly.

Dissolution of the Polymers

In a 400 ml beaker 297 g of a brine containing 10.0 g of sodium chloride, 1.0 g of calcium chloride and 0.1 g of magnesium chloride per liter brine were placed and mixed with an overhead stirrer equipped with a paddle-type stirrer approx. 1.5 cm smaller than the diameter of the beaker. The mixing speed was 300 rpm. This results in a vortex with a bottom approx. 0.5-1 cm above the stirrer. 3 g of polymer (as is) was sprinkled carefully onto the vortex in order to prevent any baking of the polymer particles. This would result in gel lumps in the final solution. After 2 h this solution was diluted to 2,000 ppm by presenting 50 g of this solution into a beaker and adding 200 g of the brine described above. Subsequently this solution was stirred for 1 h at 300 rpm with the same overhead stirrer as described above.

Dissolution of the Polymers

In a 400 ml beaker 297 g of a brine containing 10.0 g of sodium chloride, 1.0 g of calcium chloride and 0.1 g of magnesium chloride per liter brine were placed and mixed with an overhead stirrer equipped with a paddle-type stirrer approx. 1.5 cm smaller than the diameter of the beaker. The mixing speed was 300 rpm. This results in a vortex with a bottom approx. 0.5-1 cm above the stirrer. 3 g of polymer (as is) was sprinkled carefully onto the vortex in order to prevent any baking of the polymer particles. This would result in gel lumps in the final solution. After 2 h this solution was diluted to 2,000 ppm by presenting 50 g of this solution into a beaker and adding 200 g of the brine described above. Subsequently this solution was stirred for 1 h at 300 rpm with the same overhead stirrer as described above.

Gel Content Determination 250 ml of polymer solution is poured onto a sieve with 200 μm mesh size and the polymer solution is sieved through by gravity. After all of the solution is filtered through, the sieve is washed with 2 l of tap water and the residual gel lumps are transferred into a measuring cylinder. The gel content is stated as ml/l of polymer solution.

MPFR Determination 200 ml of the filtered polymer solution is placed into a Sartorius filtration cell equipped with a 5 μm polycarbonate nucleo pore filter (aca Millipore). After closure of the cell 2 or 1 bars respectively of air (or nitrogen) is applied and the weight of the filtrate measured over time. After the filtration is finished the filtrate weight is plotted against the time of filtration and the deviation from linearity is calculated by regression analysis. Values <1.5 are within the specification for EOR polymers.

As can be seen from table 2 the amount of auxiliary surfactant necessary depends obviously on the exact structure.

TABLE 2

Polymerization results of the monomer 1 and 2 in 27 mol % sodium acrylate, 72.9 mol % acrylamide and 0.1 mol % associative monomer terpolymer with different amounts of Disponil A 1080.

| Monomer | Amount | Surfactant | Amount | Gel [ml/l] | Viscosity [mPas] | MPFR |
|---|---|---|---|---|---|---|
| 1 | 0.1 mol % | Disponil A 1080 | 0.1 mol % | 3 | 18 | 2.69 |
| 1 | 0.1 mol % | Disponil A 1080 | 0.2 mol % | 0 | 14 | 1.11 |
| 2 | 0.1 mol % | Disponil A 1080 | 0.1 mol % | 0 | 16 | 1.06 |
| 2 | 0.1 mol % | Disponil A 1080 | 0.2 mol % | 0 | 12 | 1.10 |

The invention claimed is:

1. A process for the preparation of a water-soluble copolymer comprising the step of reacting a monomer (a) of formula (I)

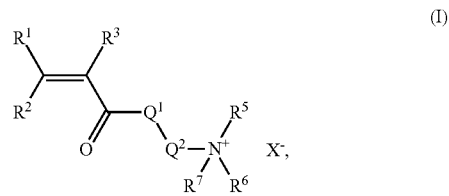

wherein $Q^1$ is O or NH;

$R^1$ and $R^2$ are H;

$R^3$ is H or $CH_3$;

$R^5$, $R^6$ are independently selected from the group consisting of $CH_3$ and $C_2H_5$;

$Q^2$ is an alkylene chain having 2 to 8 carbon atoms;

$R^7$ is a hydrocarbon radical having 10 to 14 carbon atoms;

X is a counter ion having a negative charge;

with at least one monoethylenically unsaturated, anionic monomer (b) selected from the group consisting of acrylic acid, methacrylic acid, itaconic acid, crotonic acid, maleic acid, fumaric acid, 2-acrylamido-2-methylpropane sulfonic acid, vinylsulfonic acid, vinylphosphonic acid, allylsulfonic acid, allylphosphonic acid and their salts thereof, and ammonium; and at least one monoethylenically unsaturated, non-ionic monomer (c) selected from the group consisting of acrylamide, methacrylamide, N-isopropylacrylamide, N,N-dimethylacrylamide, N-methylolacrylamide, N-vinylformamide, N-vinyl acetamide, N-vinylpyridine and N-vinylpyrrolidone;

wherein the reaction is carried out in the presence of at least a first additive, wherein the at least first additive has the formula $R^{10}$—$(OQ_3)_n$-OH, wherein $R^{10}$ is a hydrocarbon radical having 8 to 30 carbon atoms, each $Q^3$ is independently an alkylene group having 2 to 6 carbon atoms, and n is a number from 8 to 20.

2. The process of claim 1, wherein $Q^1$ is O; with at least one monoethylenically unsaturated, anionic monomer (b) selected from the group consisting of water-soluble salts of an alkali metal, alkaline-earth metal and ammonium; and at least one monoethylenically unsaturated, non-ionic monomer (c) selected from the group consisting of acrylamide, methacrylamide, N-isopropylacrylamide, N,N-dimethylacrylamide, N-methylolacrylamide, N-vinylformamide, N-vinyl acetamide, N-vinylpyridine and N-vinylpyrrolidone; wherein the reaction is carried out in the presence of at least a first additive, wherein the at least first additive has the formula $R^{10}$—$(OQ_3)_n$-OH, wherein $R^{10}$ is a hydrocarbon radical having 8 to 30 carbon atoms, each $Q^3$ is ethylene, and n is a number from 8 to 20.

3. The process of claim 1, wherein the copolymer has a molecular weight greater than 500,000 g/mol.

4. The process of claim 1, wherein the copolymer comprises monomers (a), (b) and (c) in an amount of at least 90 mol-% based on the total amount of all monomers of the copolymer.

5. The process of claim 1, wherein at least one of the following requirements is fulfilled:
$Q^2$ is an alkylene chain having 2 to 6 carbon atoms;
X is halide.

6. The process of claim 1, wherein monomer (a) is a monomer of formula (I) wherein
$Q^1$ is NH, $R^1$ and $R^2$ are H, $R^3$ is $CH_3$, $R^5$ and $R^6$ are $CH_3$ $R^7$ is an unbranched alkyl chain having 12 carbon atoms;
$Q^1$ is NH, $R^1$ and $R^2$ are H, $R^3$ is H, $R^5$ and $R^6$ are $CH_3$ $R^7$ is an unbranched alkyl chain having 12 carbon atoms;
$Q^1$ is O, $R^1$ and $R^2$ are H, $R^3$ is $CH_3$, $R^5$ and $R^6$ are $CH_3$ $R^7$ is an unbranched alkyl chain having 12 carbon atoms; or
$Q^1$ is O, $R^1$ and $R^2$ are H, $R^3$ is H, $R^5$ and $R^6$ are $CH_3$ $R^7$ is an unbranched alkyl chain having 12 carbon atoms.

7. The process of claim 1, wherein the at least one monoethylenically unsaturated, anionic monomer (b) is acrylic acid, methacrylic acid, 2-acryl-2-methylpropane sulfonic acid, or a salt thereof.

8. The process of claim 1, wherein the least one monoethylenically unsaturated, non-ionic monomer (c) is water-soluble.

9. The process of claim 1, wherein the least one monoethylenically unsaturated, non-ionic monomer (c) is water-soluble, acrylamide or methacrylamide.

10. The process of claim 1, wherein the reaction is carried out with
0.01 mol-% to 1 mol-% monomer (a),
9 mol-% to 70 mol-% monomer (b),
29 mol-% to 90.99 mol-% monomer (c),
each based on the total amount of all monomers of the copolymer.

11. The process of claim 1, wherein the reaction is carried out with
0.05% to 0.5% monomer (a),
15% to 40% monomer (b),
59.5% to 84.5% monomer (c),
each based on the total amount of all monomers of the copolymer.

12. The process of claim 1, wherein the reaction is carried out in the presence of at least the first additive and a second additive, wherein the second additive is a sulfosuccinate of formula (II)

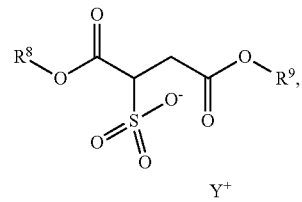

(II)

wherein
$R^8$, $R^9$ are independently a hydrocarbon radical having 4 to 32 carbon atoms; and
Y is a counter ion with a positive charge.

13. The process of claim 12, wherein $R^8$ and $R^9$ are the same and are a hydrocarbon radical having 4 to 20 carbon atoms; and Y is an alkali cation.

14. The process of claim 12, wherein the second additive is sodium diisooctyl sulfosuccinate.

15. The process of claim 1, wherein the molar ratio of first additive, the second additive or the first and the second additive to monomer (a) is 1:10 to 10:1.

16. The process of claim 1, wherein the process is a free-radical polymerization undertaken by means of gel polymerization, in an adiabatic gel polymerization in aqueous phase.

17. A water-soluble copolymer obtainable by the process of claim 1.

18. An aqueous formulation comprising water and at least one copolymer of claim 17.

19. A process for mineral oil production, comprising the steps of injecting an aqueous formulation of claim 18 into a mineral oil deposit through an injection well and withdrawing crude oil from the deposit through at least one production well.

* * * * *